UNITED STATES PATENT OFFICE.

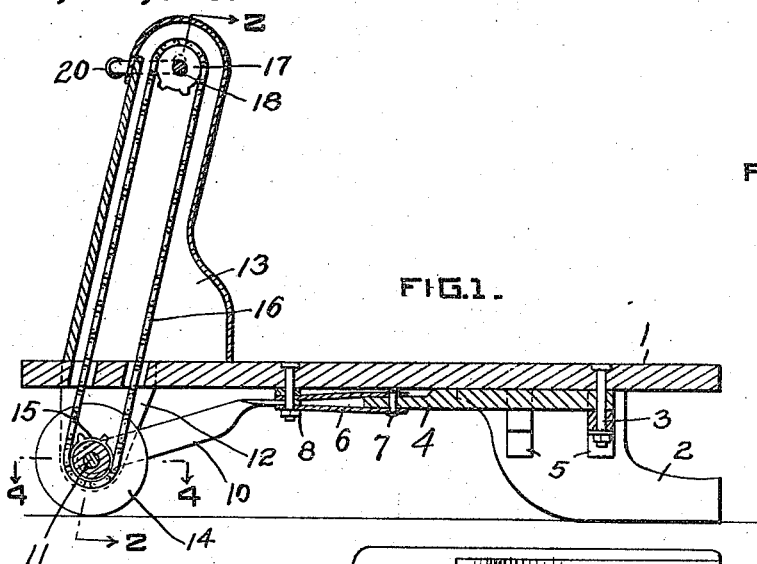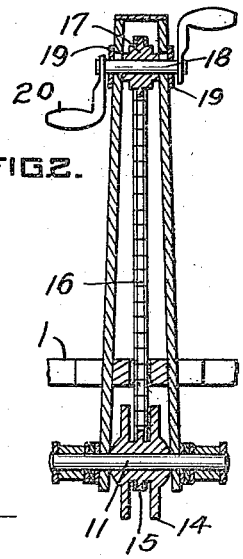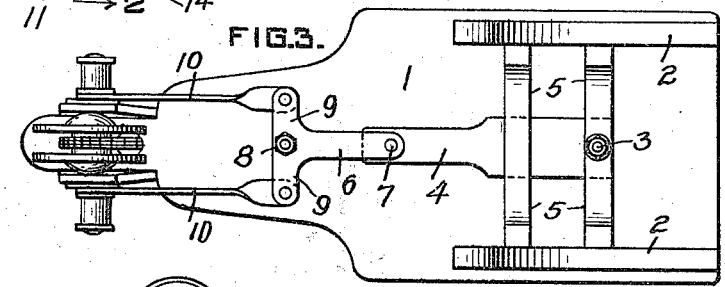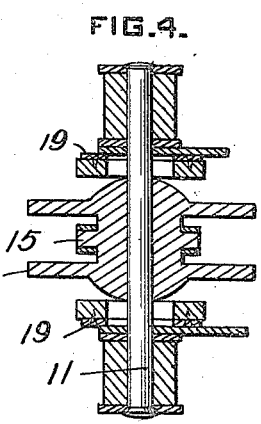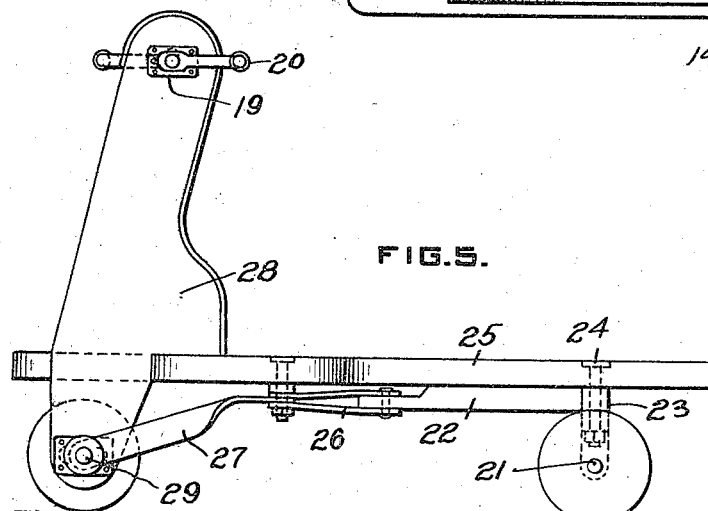

JAMES HAGERTY, OF MOUNT LEBANON, PENNSYLVANIA.

SLED.

1,268,836.  Specification of Letters Patent.  Patented June 11, 1918.

Application filed October 25, 1917. Serial No. 198,474.

*To all whom it may concern:*

Be it known that I, JAMES HAGERTY, a citizen of the United States, residing at Mount Lebanon, in the county of Allegheny and State of Pennsylvania, have invented a new and useful Improvement in Sleds, of which the following is a specification.

My invention relates to that class of vehicles commonly called sleds.

The object of my invention is to produce a vehicle of this kind which can be used on flat as well as hilly or undulating surfaces, and to accomplish this object my invention consists in the novel construction and arrangement of parts hereinafter more specifically described, reference being had to the accompanying drawings, forming part hereof, in which:

Figure 1 is a longitudinal sectional view.

Fig. 2 is a vertical sectional view on line 2—2 of Fig. 1.

Fig. 3 is an inverted plan view.

Fig. 4 is an enlarged sectional view of the forward guiding axle, showing also the sprocket wheel.

Fig. 5 is an elevation of a modification of my device.

Referring to said drawings, 1 is a base or body portion, to which runners, 2, are swingingly or pivotally secured, by means of the king pin, 3. A tongue, 4, is pivotally mounted upon said king pin and connected to the transverse bars, 5, to which the runners are firmly secured. The said tongue, 4, extends from said king pin to the inner end of the yoke, 6, to which it is pivotally secured by means of the pin, 7. The forward end of said yoke is pivotally mounted upon the pin, 8, and the laterally extending arms, 9, thereof, are connected to the inner end of the bars or rods, 10, the opposite ends of which are mounted upon the axle, 11. The said axle is slidably journaled in the downwardly projecting members, 12, of the housing or frame, 13. Between the said members, 12, of said housing, a propeller wheel, 14, is mounted upon said axle. The hub portion of said wheel is provided with a sprocket wheel, 15, which, as shown, is integral with the wheel, 14. A chain, 16, or other propelling means, passes over said sprocket and extends upwardly through the frame, 13, and over a sprocket, 17, mounted in the upper end of the frame, 13, as shown in Fig. 1, said last mentioned sprocket being mounted upon the shaft, 18, which is mounted in adjustable bearings formed in the plates, 19, the said shaft being provided with handles, 20, by means of which the said chain is operated for the purpose of propelling the vehicle upon flat surfaces, if desirable.

In Fig. 5, I show a modified form of my improvement, the said modification consisting of the substitution of wheels for the runners, the said wheels being mounted upon an axle, 21, which is supported in the swinging truck which comprises the tongue, 22, and cross bars, 23, a king pin, 24, connecting said swinging truck to the body portion, 25. The tongue, 22, is pivotally secured to the inner end of the yoke, 26, in a manner similar to that heretofore described, with reference to Figs. 1 to 4, the said yoke being connected to the axle in a similar way to that heretofore described, by means of the rods, 27. The housings or frame, 28, carry the bearings for a sprocket wheel in the upper end thereof, from which a chain operates and over a sprocket wheel, 29, similar to that heretofore described mounted on the axle, 21, which is mounted in bearings formed in the lower portion of the frame, 28.

Having described my invention, what I claim and desire to secure by Letters Patent, is:

1. In a vehicle of the kind described, the combination of a body portion, a truck swingingly or pivotally secured to the rear end thereof, an axle movably mounted on the forward end of said body portion, connections between said axle and said truck, adapted to transmit motion from the axle to the truck, a propeller wheel mounted on said axle and means to operate said propeller wheel.

2. In a vehicle of the kind described, the combination of a body portion, a truck pivotally secured to the rear end thereof, a tongue secured to said truck, a yoke pivotally secured to the body portion and pivotally secured to the forward end of said tongue, an axle mounted in the forward end of the body portion and connections between said axle and said yoke, a propeller wheel mounted upon said axle and provided with a sprocket wheel, a housing secured to the forward end of said body portion, a sprocket wheel mounted in the upper end of said housing, a chain operating over said sprocket wheels and means to operate the same.

3. In a vehicle of the kind described, the combination of a body portion, a truck pivotally secured to the rear end thereof, a tongue secured to said truck, a yoke pivotally secured to the body portion and pivotally secured to the forward end of said tongue, an axle mounted in the forward end of the body portion and connections between said axle and said yoke, a propeller wheel mounted upon said axle and provided with a sprocket wheel, an upwardly projecting frame secured to the forward end of said body portion incasing a sprocket wheel and a chain and carrying adjustable bearings for said sprocket wheel and means to operate said chain.

In testimony whereof, I have hereunto signed my name in the presence of two subscribing witnesses.

JAMES HAGERTY.

In the presence of—
JOHN H. RONEY,
CLARENCE A. WILLIAMS.

Copies of this patent may be obtained for five cents each, by addressing the "Commissioner of Patents, Washington, D. C."